Figure 2:
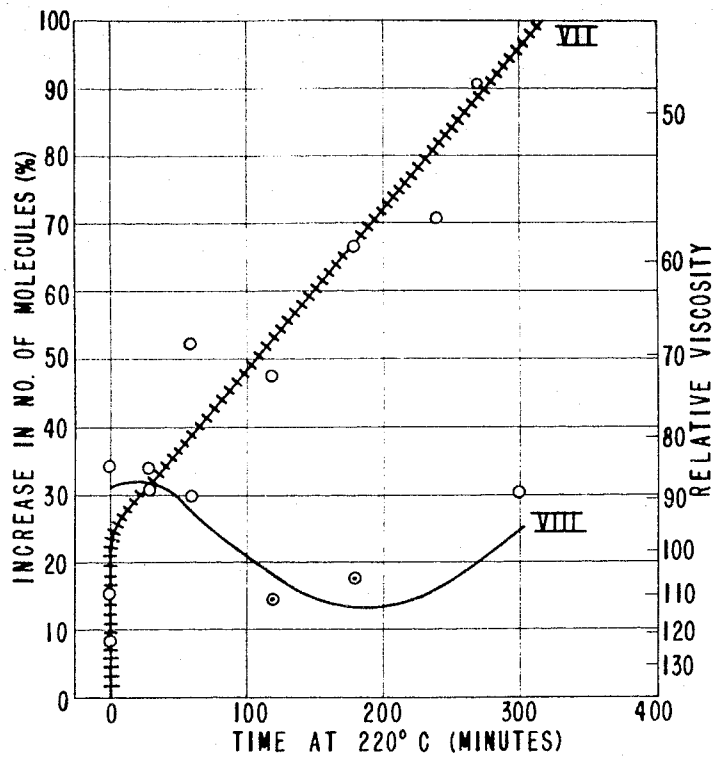
Figure 1:
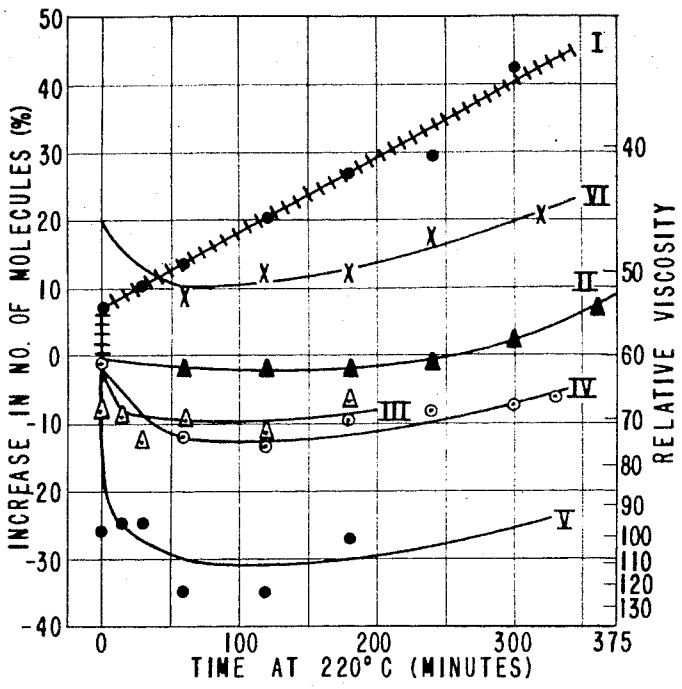

T 863,008

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1000

739,287

SYNTHETIC POLYESTER IN METHYLENE CHLORIDE SOLUTION STABILIZED WITH TETRAPHENYL TIN

John E. Berkowitch, Wilmington, Del., assignor to E. I. du Pont de Nemours and Company, Wilmington, Del., a corporation of Delaware

Filed June 24, 1968. Published June 24, 1969
Int. Cl. C08g *51/62*
U.S. Cl. 260—33.8
1 Sheet Drawing. 17 Pages Specification

Solutions of synthetic polyesters such as polyethylene terephthalate in liquids comprising methylene chloride at elevated temperatures and pressures can be stabilized against degradation of the polymer by addition of tetraphenyl tin. Presence of tetraphenyl tin not only prevents decrease of molecular weight of the polymer, but frequently produces a molecular weight increase, as indicated by an increase in polymer relative viscosity. The solutions, which may also contain another halogenated hydrocarbon liquid in minor proportion, can be flash-extruded to produce ultra-microcellular structures. Presence of the additive reduces flow rate through the extrusion orifice and improves the physical properties of the extruded structures.

T 863,008

June 24, 1969 J. E. BERKOWITCH DEF. PUB.

SYNTHETIC POLYESTER IN METHYLENE CHLORIDE SOLUTION
STABILIZED WITH TETRAPHENYL TIN
Filed June 24, 1968

SN - 739287

INVENTOR
JOHN E. BERKOWITCH

BY Don M. Kerr

ATTORNEY